US010760475B2

(12) United States Patent
Joyce et al.

(10) Patent No.: US 10,760,475 B2
(45) Date of Patent: Sep. 1, 2020

(54) INTEGRATED PASSIVE ONE WAY VALVE IN CHARGE AIR INLET TANK

(71) Applicant: Hanon Systems, Daejeon (KR)

(72) Inventors: Stephen Joyce, Redhill (GB); Jon Stansfield, Chelmsford (GB); Jake Taylor, Frome (GB); Tom Kelham, London (GB); Tom Baldwin, Halstead (GB); Leo Somhorst, Chislehurst (GB)

(73) Assignee: HANON SYSTEMS, Daejeon (KR)

( * ) Notice: Subject to any disclaimer, the term of this patent is extended or adjusted under 35 U.S.C. 154(b) by 79 days.

(21) Appl. No.: 16/032,150

(22) Filed: Jul. 11, 2018

(65) Prior Publication Data

US 2019/0186345 A1    Jun. 20, 2019

Related U.S. Application Data

(60) Provisional application No. 62/599,317, filed on Dec. 15, 2017.

(51) Int. Cl.
*F02B 29/04* (2006.01)
*F02M 31/20* (2006.01)
(Continued)

(52) U.S. Cl.
CPC ........ *F02B 29/0431* (2013.01); *F02B 29/045* (2013.01); *F02B 29/0406* (2013.01);
(Continued)

(58) Field of Classification Search
CPC ............. F04B 53/1037; F04B 53/1047; Y10T 137/7856; Y10T 137/7891;
(Continued)

(56) References Cited

U.S. PATENT DOCUMENTS 4,690,107 A * 9/1987 Emler ..................... F01L 3/205
123/65 V
5,247,912 A * 9/1993 Boyesen ................. F01L 3/205
123/65 V
(Continued)

FOREIGN PATENT DOCUMENTS

CA       2500146 A1    9/2006
DE      10245336 A1    4/2004
(Continued)

*Primary Examiner* — Jesse S Bogue
(74) *Attorney, Agent, or Firm* — Shumaker, Loop & Kendrick, LLP; James D. Miller

(57) ABSTRACT

An inlet tank for a charge cooler comprises a manifold portion, a turbocharger inlet port, and a supercharger inlet port. The turbocharger inlet port is in fluid communication with a compressor wheel of a turbocharger and the manifold portion of the inlet tank. An opening is formed in a sidewall of the turbocharger inlet port. The supercharger inlet port is in fluid communication with an electric supercharger and intersects the turbocharger inlet port. The opening formed in the sidewall of the turbocharger inlet port provides fluid communication between the supercharger inlet port and the turbocharger inlet port. A valve element selectively determines when a flow of air from the supercharger inlet port enters the turbocharger inlet port through the opening based on a pressure differential present between the air exiting the compressor wheel of the turbocharger and the air exiting a compression mechanism of the electric supercharger.

17 Claims, 10 Drawing Sheets

(51) Int. Cl.
*F16K 15/03* (2006.01)
*F02M 35/10* (2006.01)
*F16K 15/16* (2006.01)
*F16K 15/04* (2006.01)
*F16K 15/06* (2006.01)
*F02B 37/14* (2006.01)
*F02B 37/04* (2006.01)

(52) U.S. Cl.
CPC .......... *F02B 29/0475* (2013.01); *F02B 37/04* (2013.01); *F02B 37/14* (2013.01); *F02M 31/20* (2013.01); *F02M 35/10157* (2013.01); *F02M 35/10255* (2013.01); *F16K 15/03* (2013.01); *F16K 15/038* (2013.01); *F16K 15/04* (2013.01); *F16K 15/063* (2013.01); *F16K 15/16* (2013.01)

(58) Field of Classification Search
CPC ............... Y10T 137/7892; F16K 15/16; F02B 29/0431; F02B 29/0475; F02M 31/20
See application file for complete search history.

(56) References Cited

U.S. PATENT DOCUMENTS

| | | | | |
|---|---|---|---|---|
| 6,029,452 A | * | 2/2000 | Halimi | F02B 33/40 60/612 |
| 6,321,538 B2 | * | 11/2001 | Hasler | F02B 37/001 60/612 |
| 7,047,918 B1 | * | 5/2006 | Polimeni, Jr. | F01L 3/205 123/73 V |
| 7,975,478 B2 | * | 7/2011 | Zielke | F01N 3/0231 123/568.12 |
| 8,555,636 B2 | * | 10/2013 | Schwarzenthal | F01N 5/04 60/605.1 |
| 8,959,896 B2 | * | 2/2015 | Yanagida | F16K 15/16 137/512.15 |
| 2004/0128986 A1 | * | 7/2004 | Glover | F01N 1/02 60/289 |
| 2007/0083677 A1 | * | 4/2007 | Cecka | A61M 16/208 710/1 |
| 2007/0119459 A1 | * | 5/2007 | Japuntich | A62B 18/025 128/207.12 |
| 2012/0000161 A1 | * | 1/2012 | Free | B65B 1/46 53/113 |
| 2012/0168658 A1 | * | 7/2012 | Insley | F16K 15/031 251/298 |
| 2012/0177510 A1 | * | 7/2012 | Delong | F16K 15/031 417/297 |
| 2012/0297769 A1 | * | 11/2012 | Gerum | F02B 21/00 60/611 |
| 2013/0108482 A1 | * | 5/2013 | Johnson | A61M 1/0031 417/300 |
| 2013/0298885 A1 | * | 11/2013 | Efta | F01M 13/0011 123/574 |
| 2014/0053547 A1 | * | 2/2014 | Wade | F02B 37/04 60/599 |
| 2014/0165561 A1 | * | 6/2014 | Kingsbury | F02B 37/10 60/612 |
| 2016/0326998 A1 | * | 11/2016 | Metz | F02M 35/10275 |
| 2017/0198823 A1 | * | 7/2017 | Abouelleil | F16K 15/031 |
| 2018/0306144 A1 | * | 10/2018 | Redon | F02M 26/23 |

FOREIGN PATENT DOCUMENTS

| | | |
|---|---|---|
| DE | 102006014945 A1 | 10/2007 |
| DE | 102015208417 A1 | 11/2016 |
| JP | H0319658 Y2 | 4/1991 |
| KR | 20120113761 A | 10/2012 |
| KR | 20140005220 A | 1/2014 |

* cited by examiner

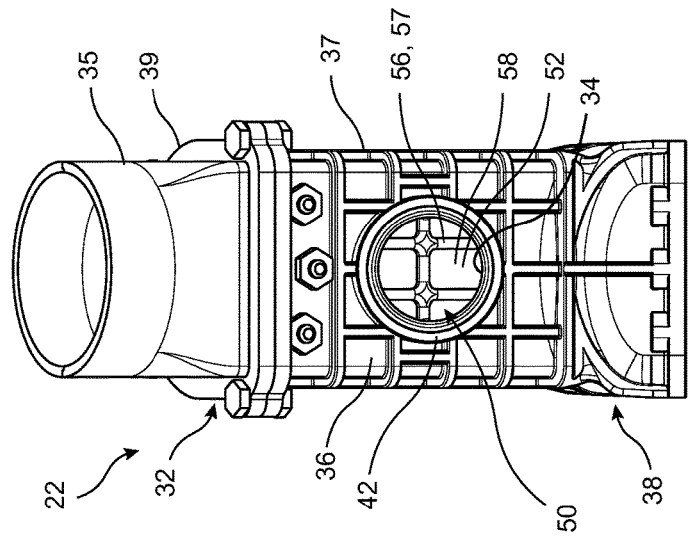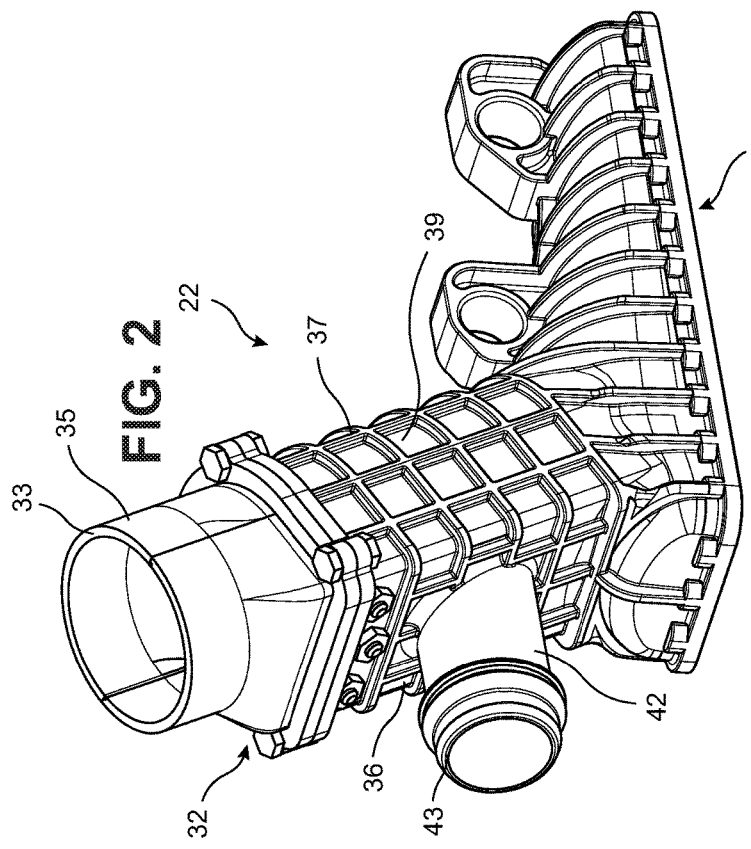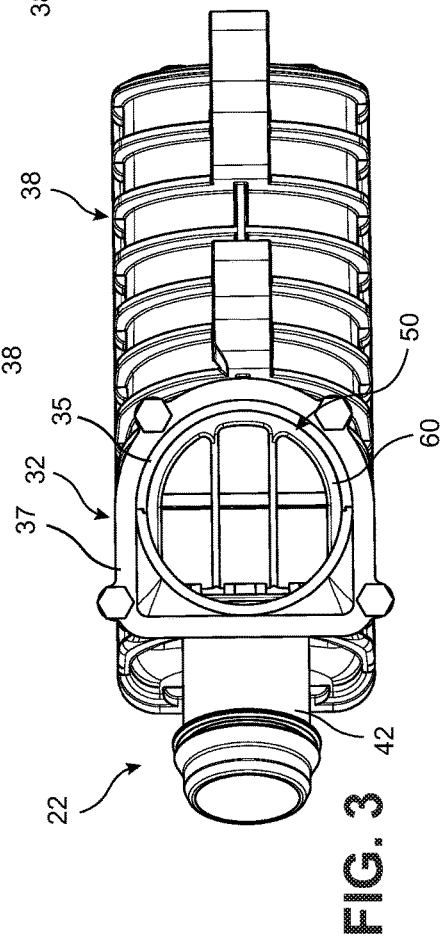

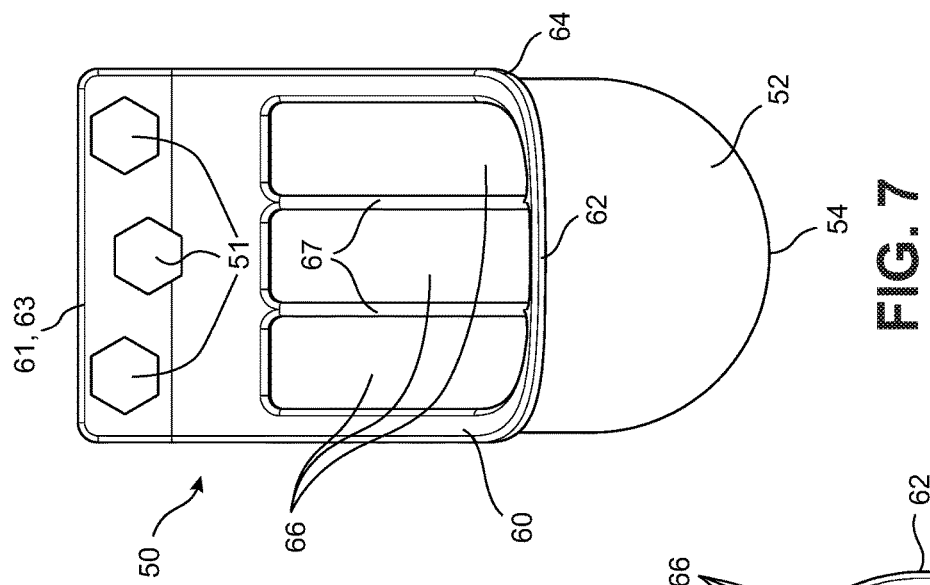
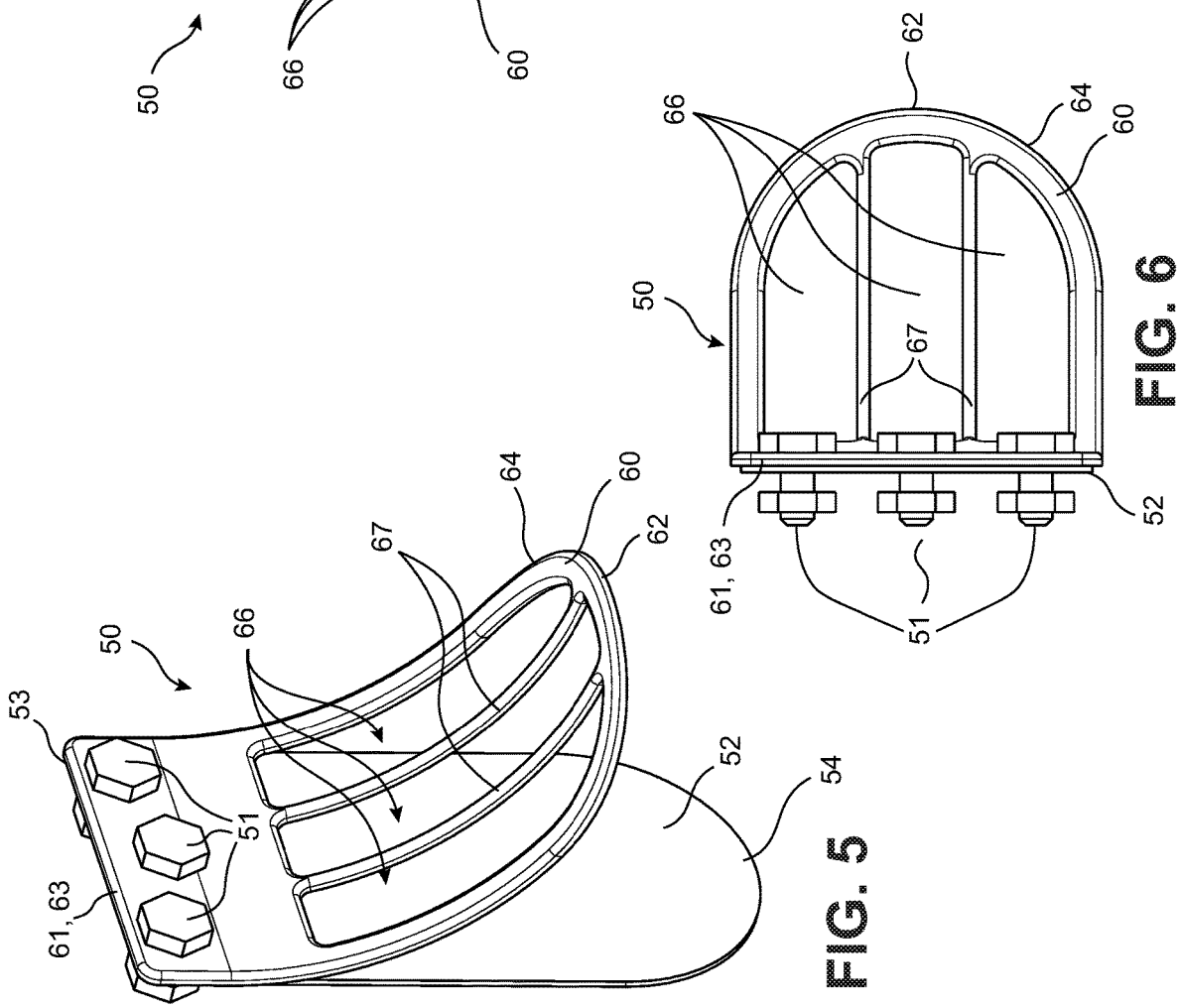

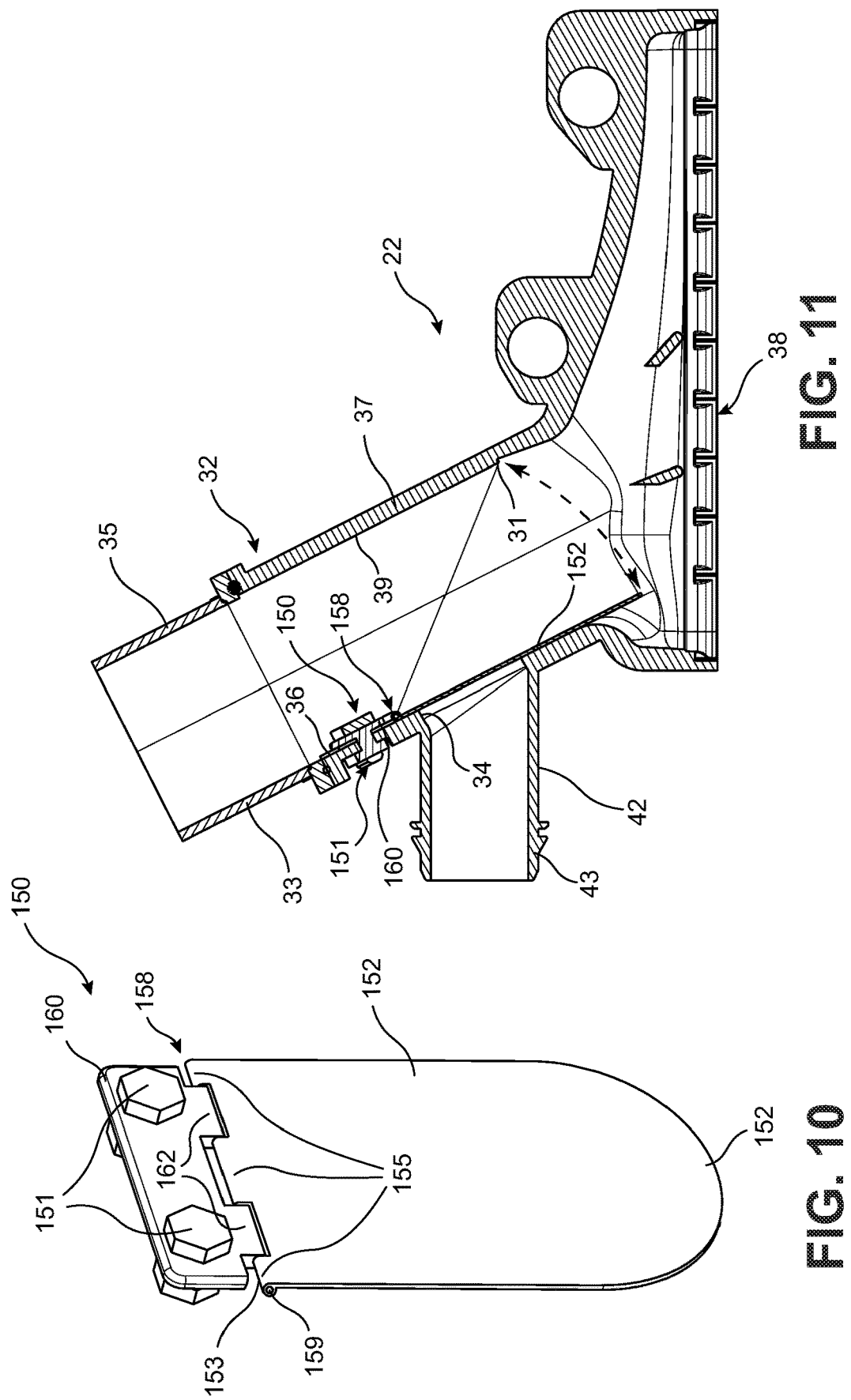

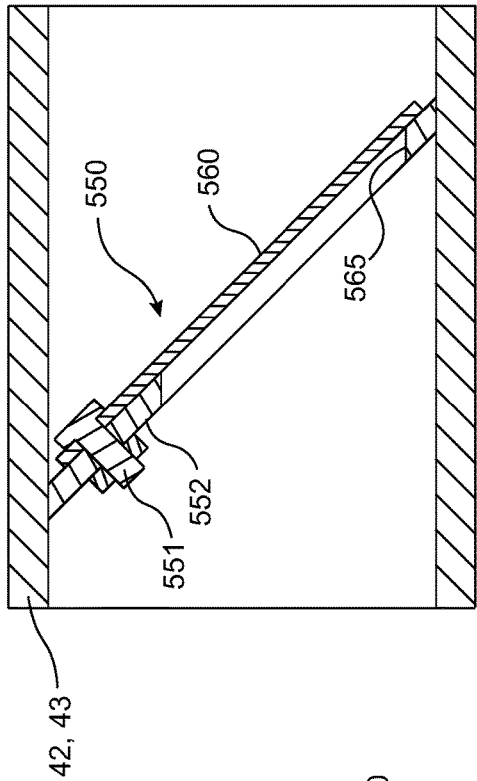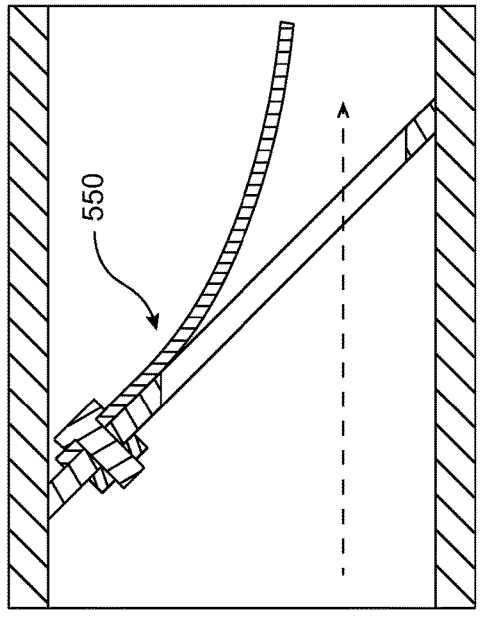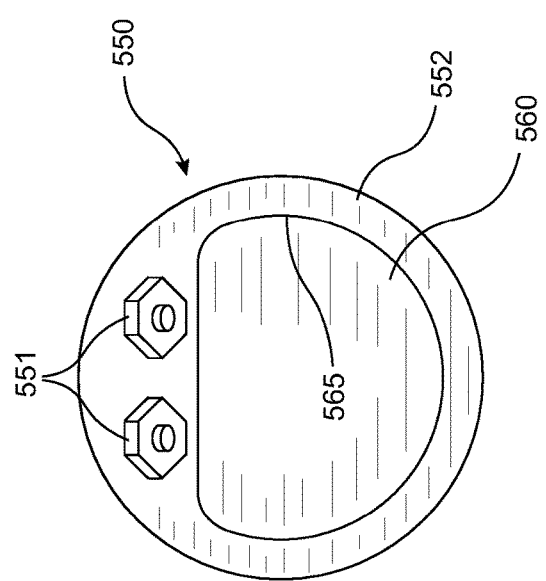

INTEGRATED PASSIVE ONE WAY VALVE IN CHARGE AIR INLET TANK

CROSS-REFERENCE TO RELATED APPLICATION

This patent application claims priority to U.S. Provisional Patent Application Ser. No. 62/599,317, filed on Dec. 15, 2017, the entire disclosure of which is hereby incorporated herein by reference.

FIELD OF THE INVENTION

The invention relates to a passive one-way valve integrated into the inlet tank of a charge air cooler of a turbocharger system, wherein the passive one-way valve prevents charged air originating from one of a turbocharger or a supplemental electric supercharger from flowing back towards the other of the turbocharger or the supplemental electric supercharger.

BACKGROUND OF THE INVENTION

Many vehicles utilize a turbocharger system for increasing the pressure of intake air entering a combustion chamber of an engine. A typical turbocharger system includes a turbocharger and a charge air cooler. The turbocharger may include a shaft having a turbine wheel and a compressor wheel operatively coupled thereto. Exhaust gas exiting the engine drives the turbine wheel to cause a rotation thereof which in turn rotates the compressor wheel. The rotation of the compressor wheel compresses a stream of air to be delivered to the combustion chamber of the engine. The compressing of the air increases both a pressure and a temperature of the air. The charge air cooler is used to cool the compressed air to increase a density of the compressed air, which in turn improves the efficiency of the engine by increasing an amount of oxygen entering the combustion chamber per unit of volume of the compressed air.

There exist situations where the turbocharger may not be able to increase the pressure of the intake air entering the engine to the desired degree due to a lack of pressure of the exhaust gases being used to drive the turbine wheel of the turbocharger. Such a situation may occur when the amount of power delivered by the engine is increasing rapidly, such as when the vehicle is rapidly accelerating from a relatively low speed requiring little demand on the engine. As a result, some turbocharger systems may further include a supplemental electric supercharger for meeting the demands of the engine when the pressure of the exhaust gas exiting the engine is not great enough to rotate the turbine wheel at a desired rotational speed.

The electric supercharger includes an electrically driven compressor wheel that can be activated to operate at a desired rotational speed regardless of the pressure of the exhaust gases exiting the engine. As such, turbocharger systems utilizing both the traditional turbocharger and the supplemental electric supercharger are able to maintain a desired pressure of the intake air delivered to the engine by selectively operating the electric supercharger based on the demands of the engine.

A flow path for the stream of air compressed by the electric supercharger and a flow path for the stream of air compressed by the turbocharger must be recombined upstream of the engine. One issue faced by the introduction of the electric supercharger to the turbocharger system relates to an undesired flow of the compressed intake air exiting the turbocharger back into the flow path for the intake air exiting the electric supercharger at an intersection of the flow paths. The intake air exiting the turbocharger is heated to an extent that the backflow of the intake air towards the electric supercharger can potentially impair the electric supercharger in a manner that shortens an effective life span thereof.

One solution to preventing the backflow of the air towards the electric supercharger includes the use of an electrically controlled valve that is operated to selectively close off the flow path from the electric supercharger when the electric supercharger is not in use. However, the use of an electrically controlled valve is cost prohibitive, increases the energy demands of the vehicle, and requires advanced control schemes for the timing of the electric actuation of each corresponding valve.

It would therefore be desirable to produce a passive one-way valve at the intersection of the flow path for the air compressed by the turbocharger and the flow path for the air compressed by the electric supercharger to prevent an incidence of back flow into the flow path having the electric supercharger or the flow path having the compressor wheel of the turbocharger.

SUMMARY OF THE INVENTION

Compatible and attuned with the present invention, a passive valve for preventing undesired flow into an electric supercharger of a turbocharger system has surprisingly been discovered.

In one embodiment of the invention, a valve assembly comprises a first conduit having an inner surface defined by a sidewall with the sidewall including an opening formed therein. The valve assembly further comprises a second conduit intersecting the first conduit. The opening formed in the sidewall of the first conduit provides fluid communication between the first conduit and the second conduit. A valve element coupled to the sidewall of the first conduit is passively adjustable between a first position wherein the valve element prevents fluid communication between the first conduit and the second conduit and a second position wherein the valve element allows fluid communication between the first conduit and the second conduit.

In another embodiment of the invention, an inlet tank for a charge cooler is disclosed. The inlet tank comprises a manifold portion, a turbocharger inlet port in fluid communication with a compressor wheel of a turbocharger and the manifold portion, and a supercharger inlet port in fluid communication with a compression mechanism of an electric supercharger. An opening is formed in a sidewall of the turbocharger inlet port for providing fluid communication between the supercharger inlet port and the turbocharger inlet port. A valve mechanism is passively adjustable between a first position wherein the valve mechanism prevents fluid communication between the turbocharger inlet port and the supercharger inlet port and a second position wherein the valve mechanism allows fluid communication between the turbocharger inlet port and the supercharger inlet port.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 2 is perspective view of an inlet tank of a charge cooler of the turbocharger system of FIG. 1;

FIG. 3 is a plan view of the inlet tank of FIG. 2 from a perspective directed along a central axis of a first inlet port of the inlet tank;

FIG. 4 is an elevational view of the inlet tank of FIG. 2 from a perspective directed along a central axis of a second inlet port of the inlet tank arranged substantially transverse to the first inlet port thereof;

FIG. 5 is a perspective view of a valve mechanism according to another embodiment of the present invention;

FIG. 6 is a top plan view of the valve mechanism of FIG. 5;

FIG. 7 is a front elevational view of the valve mechanism of FIG. 5;

FIG. 10 is a perspective view of a valve mechanism according to another embodiment of the invention;

FIG. 11 is a cross-sectional elevational view of the inlet tank having the valve mechanism of FIG. 10 disposed therein;

FIG. 20 is an elevational view of a valve mechanism according to another embodiment of the present invention;

FIG. 21 is a cross-sectional elevational view of an inlet port having the valve mechanism of FIG. 20, wherein the valve mechanism is adjusted to a first position;

FIG. 22 is a cross-sectional elevational view of the inlet port of FIG. 21 when the valve mechanism is adjusted to a second position.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
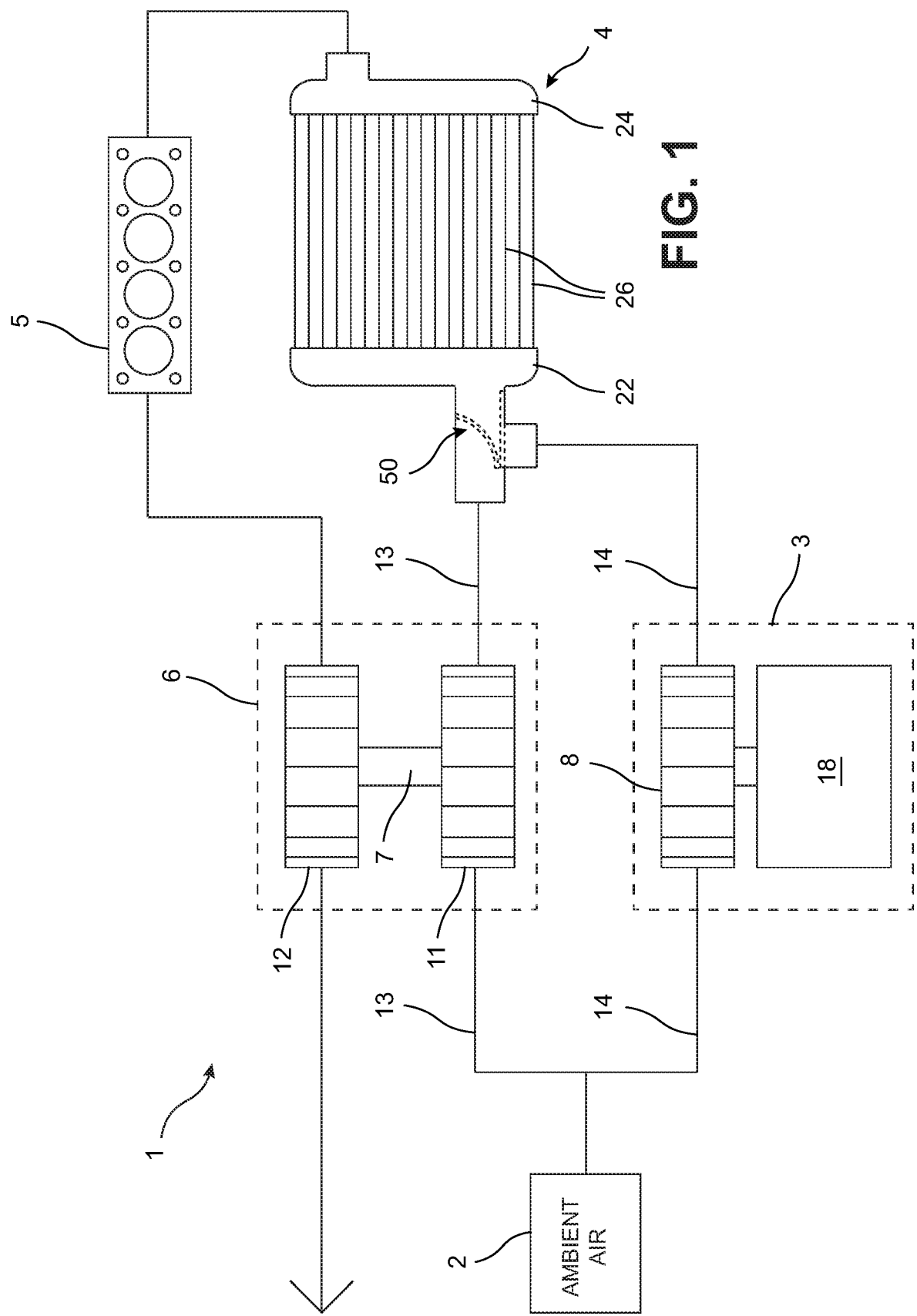
FIG. 1 is a schematic diagram of a turbocharger system according to an embodiment of the invention.

FIG. 1 illustrates a turbocharger system 1 of a motor vehicle according to an embodiment of the present invention. The turbocharger system 1 includes an air source 2, an electric supercharger 3, a charge cooler 4, an internal combustion engine 5, and a turbocharger 6. The electric supercharger 3 includes a compression mechanism 8 and an electric motor 18. The turbocharger 6 includes a compressor wheel 11 and a turbine wheel 12.

The air source 2 may be ambient air originating from an exterior of the motor vehicle, for example. A first flow path 13 and a second flow path 14 are formed downstream of the air source 2 with respect to a direction of flow of the air through the turbocharger system 1. The air flowing through the first flow path 13 encounters the compressor wheel 11 of the turbocharger 6 and the air flowing through the second flow path 14 encounters the compression mechanism 8 of the electric supercharger 3.

In other embodiments, the first flow path 13 and the second flow path 14 may receive air from two independent sources of the air without departing from the scope of the present invention. Each of the flow paths 13, 14 may include one or more valves (not shown) for determining when to selectively supply a flow of air to one or both of the flow paths 13, 14. The valves may be actively controlled and in signal communication with a controller of the motor vehicle. The controller may include instructions regarding a control scheme for making determinations such as when to supply the air to each of the flow paths 13, 14 and when to activate the electric supercharger 3, for example.

The compressor wheel 11 and the turbine wheel 12 are each coupled to a common shaft 7 of the turbocharger 6. The turbine wheel 12 is driven to rotate about the common shaft 7 by a flow of exhaust gas exiting the internal combustion engine 5. The compressor wheel 11 rotates about the common shaft 7 in unison with the turbine wheel 12. The compressor wheel 11 is configured to compress the flow of the air through the first flow path 13 when driven by the rotation of the turbine wheel 12 about the common shaft 7, wherein the compression capacity of the compressor wheel 11 is determined by a flow rate and a pressure of the exhaust gases driving the rotation of the turbine wheel 12.

Although not pictured, a bypass line may be disposed in parallel with the turbine wheel 12 for bypassing the turbine wheel 12 when a compressing of the air by the compressor wheel 11 is no longer desired or desired at a reduced rate. An actively controlled valve (not shown) may be disposed upstream of the bypass line and the turbine wheel 12 for distributing the exhaust gases therebetween.

The compression mechanism 8 of the electric supercharger 3 may have similar structure to the compressor wheel 11 of the turbocharger 6, as desired. The compression mechanism 8 may be a compressor wheel coupled to and driven to rotate by the electric motor 18. However, any form of electrically powered compression mechanism may be used without departing from the scope of the present invention. The electric supercharger 3 is configured to compress the flow of the air through the second flow path 14 when the electric supercharger 3 is operationally activated to increase a pressure of the air flowing through the electric supercharger 3.

Although not pictured, the turbocharger system 1 may instead include the second flow path 14 branching away from the first flow path 13 at a position downstream of the compressor wheel 11, thereby presenting a configuration wherein the second flow path 14 receives a supply of air having already been compressed by the compressor wheel 11 of the turbocharger 6. As such, the compression mechanism 8 of the electric supercharger 3 may receive air that has already been previously compressed to some extent by the turbocharger 6. An actively controlled valve (not shown) may be disposed at an inlet into the second flow path 14 for distributing the air exiting the compressor wheel 11 between the first and second flow paths 13, 14.

The charge cooler 4 is disposed downstream of each of the first flow path 13 and the second flow path 14. The charge cooler 4 is configured to decrease a temperature of the air passing therethrough. The charge cooler 4 includes an inlet tank 22, an outlet tank 24, and a plurality of heat exchanger tubes 26 extending between the inlet tank 22 and the outlet tank 24. In the present embodiment, the inlet tank 22 acts as a manifold for distributing the air to each of the heat exchanger tubes 26 while the outlet tank 24 acts as a manifold for recombining the air after flowing through individual ones of the heat exchanger tubes 26. A secondary fluid such as water or an independent flow of air may be used to cool the air passing through the heat exchanger tubes 26 of the charge cooler 4, for example. The charge cooler 4 may accordingly be referred to as an air cooled charge air cooler or a water cooled charge air cooler depending on the selection of the secondary fluid. Although the charge cooler 4 is shown as having a plurality of parallel arranged heat exchanger tubes 26, it should be understood by one skilled in the art that alternative configurations and types of the heat exchanger tubes may be used without departing from the scope of the present invention. For example, the charge cooler 4 may be a plate-type heat exchanger, as desired. The structure disclosed herein with regards to the inlet tank 22 may be adapted for any type of manifold or fluid distributing structure suitable for introducing a flow of air to a plurality of the flow paths of any type of heat exchanger serving as the charge cooler 4.

The air exiting the outlet tank 24 of the charge cooler 4 is then directed to the engine 5. A mixture of the air and a fuel are combined and combusted within a combustion chamber of the engine 5. Combustion of the air and fuel mixture results in a flow of exhaust gas exiting the engine 5. The exhaust gas then flows past the turbine wheel 12 of the turbocharger 6 to rotate the compressor wheel 11 about the common shaft 7. As mentioned hereinabove, the exhaust gases exiting the engine 5 may alternatively be directed to selectively bypass the turbine wheel 12, as desired.

The electric supercharger 3 may be activated when the pressure and flow rate of the exhaust gas exiting the engine 5 is not great enough to drive the turbine wheel 12 of the turbocharger 6 to an extent necessary to compress the air flowing through the compressor wheel 11 to a degree suitable for meeting the demands of the engine 5. In other words, the electric supercharger 3 may be used to supplement or replace the compression capacity of the compressor wheel 11 when the exhaust gases exiting the engine 5 are incapable of rotating the turbine wheel 12 to a rotational speed suitable for compressing the air flowing through the compressor wheel 11 to a desired pressure (density) or at a desired flow rate. Such a condition commonly occurs during acceleration of the motor vehicle from a period of low engine demand, such as when the vehicle is at a stopped position. A time delay is typically present between an increased demand being placed on the engine 5 and an increased supply of the high pressure exhaust gases turning the turbine wheel 12 (and hence the compressor wheel 11) of the turbocharger 6, which is typically referred to as "turbo lag." The electric supercharger 3 is accordingly activated during such periods when the turbine wheel 12 is not capable of rotating at a desired rotational speed. However, the electric supercharger 3 may be operated in place of the turbocharger 6 under any desired circumstances without departing from the scope of the present invention.

Referring now to FIGS. 2-4, the inlet tank 22 of the charge cooler 4 includes a turbocharger inlet port 32 and a manifold portion 38. The turbocharger inlet port 32 forms a conduit fluidly coupling the first flow path 13 to the manifold portion 38 of the inlet tank 22. The turbocharger inlet port 32 is formed by a sidewall 33 surrounding a hollow opening of the turbocharger inlet port 32. The sidewall 33 is shown as including portions formed from the cooperation of two substantially symmetric shells engaging each other to form at least a portion of the turbocharger inlet port 32, but any combination of elements may be used to form the sidewall 33.

As shown in FIGS. 2 and 3, the turbocharger inlet port 32 may transition from a first portion 35 having a substantially cylindrical shape with a circular cross-sectional flow area to a second portion 37 having a substantially D-shaped cross-sectional flow area. An inner surface of the sidewall 33 along the second portion 37 includes a substantially planar surface 36 and a concave surface 39 extending away from the planar surface 36, the planar surface 36 and the concave surface 39 cooperating to form the D-shaped cross-sectional flow area of the second portion 37. The concave surface 39 is shown as arcuate in shape including a periphery having a pair of straight portions joined to the ends of a semi-circular portion, but alternative shapes may be used without departing from the scope of the present invention. The semi-circular portion of the concave surface 39 may be substantially aligned with the cylindrical first portion 35 of the turbocharger inlet port 32, as desired. The concave surface 39 may be smooth and curvilinear to prevent an excessive pressure drop in the flow of air passing through the turbocharger inlet port 32. Each intersection of the concave surface 39 and the planar surface 36 may include a curved connecting surface to further prevent a pressure drop in the flow of air passing through the turbocharger inlet port 32, as desired.

The inlet tank 22 further includes a supercharger inlet port 42 intersecting the turbocharger inlet port 32 at the planar surface 36 thereof. The supercharger inlet port 42 is arranged transversely relative to the turbocharger inlet port 32, and may be formed at an acute angle relative to the turbocharger inlet port 32 to prevent an excessive pressure drop for a flow of air exiting the supercharger inlet port 42 and entering the turbocharger inlet port 32 by reducing the curvature required for the air to transition from the supercharger inlet port 42 to the turbocharger inlet port 32. However, a substantially perpendicular arrangement between the turbocharger inlet port 32 and the supercharger inlet port 42 may be used without departing from the scope of the present invention.

The supercharger inlet port 42 forms a conduit fluidly coupling the second flow path 14 to each of the turbocharger inlet port 32 and the manifold portion 38 of the inlet tank 22. The supercharger inlet port 42 is formed by a sidewall 43 surrounding a hollow interior of the supercharger inlet port 42. The sidewall 43 is shown as having a substantially cylindrical shape, but it is understood that alternative shapes may be used without departing from the scope of the present invention.

The planar portion 36 of the sidewall 33 includes an opening 34 (FIG. 4) formed at an end of the supercharger inlet port 42 having a shape and a size substantially corresponding to a shape and a size of the cylindrical sidewall 43 of the supercharger inlet port 42. The opening 34 provides direct fluid communication between the supercharger inlet port 42 and the turbocharger inlet port 32. The acute angle formed between the turbocharger inlet port 32 and the supercharger inlet port 42 may cause the opening 34 to have a substantially elliptical shape at the intersection of the ports 32, 42, with a length dimension of the elliptical shape extending parallel to a direction of the flow of the air through the turbocharger inlet port 32. However, the opening 34 may have any shape without necessarily departing from the scope of the present invention.

Figure 8:
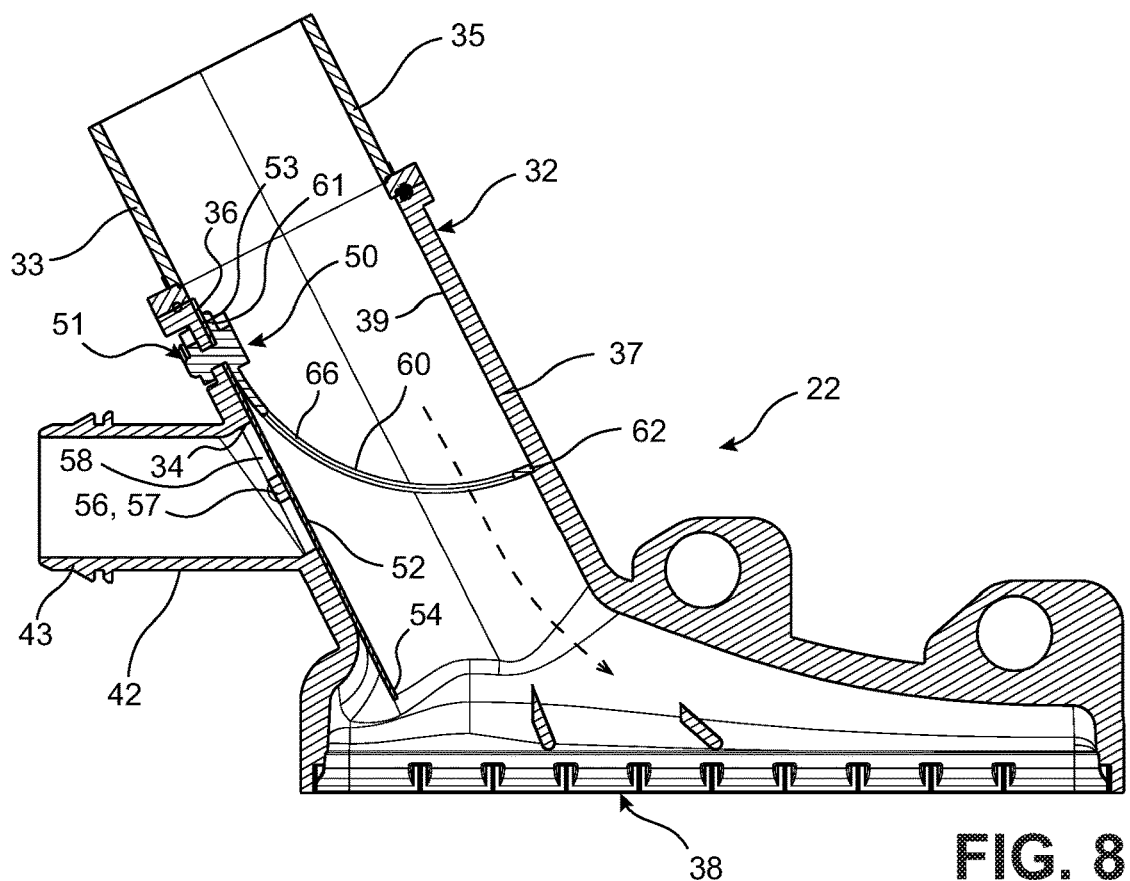
FIG. 8 is a cross-sectional elevational view of the inlet tank having the valve mechanism of FIGS. 5-7, wherein the valve mechanism is adjusted to a first position.
Figure 9:
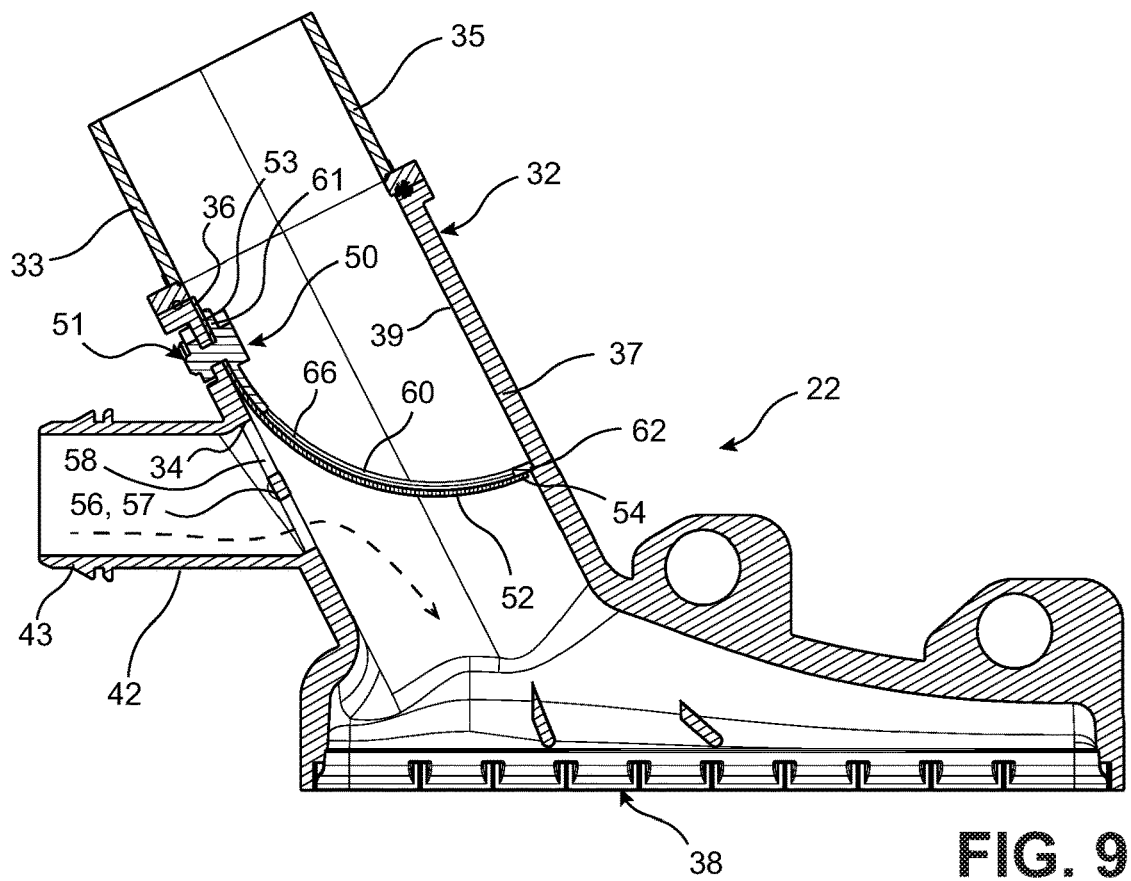
FIG. 9 is a cross-sectional elevational view of the inlet tank having the valve mechanism of FIGS. 5-7, wherein the valve mechanism is adjusted to a second position.

A valve mechanism 50 is disposed at an intersection of the turbocharger inlet port 32 and the supercharger inlet port 42. FIG. 3 shows the valve mechanism 50 from a perspective directed along a central axis of the turbocharger inlet port 32. FIG. 4 shows the valve mechanism 50 from a perspective directed along a central axis of the supercharger inlet port 42. FIGS. 5-7 illustrate the valve mechanism 50 in isolation to better illustrate the features thereof. FIGS. 8 and 9 are cross-sectional views taken through a center of the inlet tank 22 for illustrating the essential characteristics of the valve mechanism 50 during operation thereof.

The valve mechanism 50 includes a flap 52 and a guide frame 60. The valve mechanism 50 is passively adjustable between a first position and a second position. The first position (FIG. 8) includes the flap 52 disposed in abutting engagement with the planar surface 36 of the sidewall 33 to close off the opening 34 and prevent a flow of air originating from the supercharger inlet port 42 from entering the turbocharger inlet port 32. The second position (FIG. 9) includes the flap 52 pivoted or bent away from the planar surface 36 (and hence the opening 34) and engaging the guide frame 60. The flap 52 accordingly forms an adjustable valve element of the valve mechanism 50 configured for passive readjustment in response to a pressure differential across the valve mechanism 50. The guide frame 60 forms a shape for the flap 52 to take on when in the second position while also preventing an excessive bending of the flap 52 towards an inlet end of the turbocharger inlet port 32. The pivoting of the flap 52 away from the opening 34 allows for the flow of air originating from the supercharger inlet port 42 to enter the turbocharger inlet port 32 and to subsequently flow through the manifold portion 38 of the inlet tank 22. The placement of the flap 52 in the second position also prevents a flow of air entering the inlet end of the turbocharger inlet port 32 formed opposite the manifold portion 38 from reaching either of the supercharger inlet port 42 or the manifold portion 38 of the inlet tank 22. The positioning of the flap 52 accordingly determines whether the flow of air originating from the first flow path 13 or the flow of the air originating from the second flow path 14 reaches the manifold portion 38 of the inlet tank 22.

In the illustrated embodiment, a set of three fasteners 51 extends through a first end 53 of the flap, a first end 61 of the guide frame 60, and the portion of the sidewall 33 defining the planar surface 36. The fasteners 51 couple the first end 53 of the flap 52 and the first end 61 of the guide frame 60 to the turbocharger inlet port 32 along the planar surface 36 and adjacent the opening 34. The flap 52 extends across an entirety of the opening 34 when placed in the first position. The fasteners 51 are shown as comprising a nut and bolt combination, but any type of fastener may be used, as desired. Alternatively, other methods of coupling the flap 52 or the guide frame 60 to the inlet tank 22 may be used, as desired, such as adhesives, aggressive joining methods such as welding or brazing, or any other coupling method producing a fluid tight seal. The first ends of the flap 52 and the guide frame 60 may be independently coupled to the sidewall 33, as desired. Any suitable configuration may be used so long as the first end 53 of the flap 52 is disposed adjacent the first end 61 of the guide frame 60 to allow the flap 52 to flex to the shape of the guide frame 60 when flexing to the second position.

The flap 52 is shaped to extend across an entirety of a flow area of the turbocharger inlet port 32 when placed in the second position against the guide frame 60. The flap 52 includes a substantially D-shaped perimeter shape similar in shape to the D-shaped cross-section of the second portion 37 of the turbocharger inlet port 32, but lengthened to account for the curved shape of the flap 52 when engaging the guide 60. The flap 52 accordingly includes a pair of rectilinear segments extending away from the first end 53 of the flap 52 and extending towards a semi-circular segment forming a second end 54 of the flap 52.

The flap 52 is formed from a flexible material having suitable durability for repeatedly flexing between different configurations such as the first and second positions disclosed herein. The flap 52 may be formed from a polymeric material such as an elastomer (rubber). The elastomer may be a fluoroelastomer such as FKM, as one non-limiting example. The flap 52 may be formed from a composite material comprising both a polymeric material and a filler material for altering the characteristics of the polymeric material. The filler may be utilized to alter characteristics of the polymeric material such as the elasticity, strength, heat resistance, durability, or corrosion resistance thereof, thereby providing a composite material with a desired set of characteristics. The filler may comprise fibers, ribbons, cloth segments, strings, or the like, as non-limiting examples. The material forming the flap 52 may for example be a reinforced FKM rubber formed as a composite of FKM rubber with a cloth-based filler disposed therein.

The guide frame 60 is configured to extend across a cross-sectional flow area of the turbocharger inlet port 32 adjacent the supercharger inlet port 42. A profile of the guide frame 60 when viewed from the perspective of FIG. 3 includes substantially the same D-shape as a profile of an inner surface of the sidewall 33 within the second portion 37 of the turbocharger inlet port 32. The guide frame 60 includes a rectilinear segment 63 corresponding to and abutting the planar surface 36 of the sidewall 33 and a convex segment 64 corresponding to and abutting the concave surface 39 of the sidewall 33. The rectilinear segment 63 is formed at the first end 61 of the guide frame 60 while a distal surface of the convex segment 64 forms a second end 62 of the guide frame 60. The convex segment 64 includes a pair of rectilinear segments coupled to opposing ends of a semi-circular segment at the second end 62 of the guide frame 60, but alternative convex shapes may be used without departing from the scope of the present invention, so long as the profile of the guide frame 60 corresponds to the profile of the inner surface of the sidewall 33 in size and shape.

As shown in FIGS. 8 and 9, the guide frame 60 curves about an axis arranged perpendicular to the direction of extension of each of the turbocharger inlet port 32 and the supercharger inlet port 42 when the guide frame 60 extends from the first end 61 thereof abutting the planar surface 36 to the second end 62 thereof abutting a distal portion of the concave surface 39. The guide frame 60 is shown as having a curvature of a segment of a circle, but alternative curved shapes may be used without departing from the scope of the present invention. The curved shape of the guide frame 60 as the guide frame 60 extends from the first end 61 to the second end 62 thereof allows for the flap 52 to flex to the second position without requiring any isolated portion of the flap 52 to bend to an excessive degree. The continuous arc formed by the shape of the segment of the circle allows for each portion of the flap 52 to experience substantially the same amount of bending, hence a maximum stress encountered by any one portion of the flap 52 during a bending of the flap 52 is minimized to ensure a durability of the flap 52 following repeated cycles between the first and second positions.

As best shown in FIGS. 5-7, the guide frame 60 includes a plurality of openings 66 formed therethrough. A support rib 67 is disposed between each adjacent pair of the openings 66. In the illustrated embodiment, each of the support ribs 67 is shown as extending in a length direction of the guide frame 60, but the support ribs 67 may alternatively extend in a width direction of the guide frame 60 without departing from the scope of the present invention. In some embodiments, the guide frame 60 may include a plurality of transversely arranged support ribs 67 to form a grid-like pattern, as desired. The openings 66 form flow paths through which the flow of air entering the inlet end of the turbocharger inlet port 32 may flow through the guide frame 60 without causing the flow of the air to experience an excessive pressure drop. The peripheral portions of the guide frame 60 and the support ribs 67 form a stopping surface for engaging the flap 52, as explained in greater detail hereinafter.

Referring to FIGS. 4, 8, and 9, the supercharger inlet port 42 may include a support structure 56 disposed at the opening 34 in the turbocharger inlet port 32 for preventing the flap 52 from being improperly lodged within the supercharger inlet port 42 during a period of high pressure air originating from the turbocharger 6 applying a radially outward pressure on the flap 52. The support structure 56 may include a face thereof disposed co-planar with the planar surface 36 of the turbocharger inlet port 32 to allow the flap 52 to rest on each of the support structure 56 and the planar surface 36 when the valve mechanism 50 is in the first position. The support structure 56 is shown as including a grid of transversely arranged ribs 57 defining a plurality of flow openings 58 therebetween, wherein each of the flow openings 58 provides a flow path for air to exit the supercharger inlet port 42 and enter the turbocharger inlet port 32.

In use, the turbocharger system 1 may include an operating mode wherein the electric motor 18 of the electric supercharger 3 is not in operation and the compression mechanism 8 of the electric supercharger 3 does not compress the air passing through the second flow path 14. During the inactivity of the electric supercharger 3, the turbine wheel 12 of the turbocharger 6 rotates the compressor wheel 11 thereof via the shaft 7 to compress the air flowing through the first flow path 13. This mode of operation is referred to hereinafter as a "turbocharger mode of operation" of the turbocharger system 1. Alternatively, in a "supercharger mode of operation" of the turbocharger system 1, the electric motor 18 may be activated to drive the compression mechanism 8 to compress the air passing through the second flow path 14. As explained hereinabove, the supercharger mode of operation may occur during periods of increasing demand on the engine 5 such as a period of acceleration following a period of low demand on the engine 5 such as when the motor vehicle comes to a stop, as one non-limiting example. It is assumed hereinafter that the air entering the turbocharger inlet port 32 from the first flow path 13 has a greater pressure than the air entering the supercharger inlet port 42 from the second flow path 14 during operation of the turbocharger system 1 in the turbocharger mode of operation. It is also assumed hereinafter that the air entering the supercharger inlet port 42 from the second flow path 14 has a greater pressure than the air entering the turbocharger inlet port 32 from the first flow path 13 during the supercharger mode of operation.

As explained hereinabove, in some embodiments the second flow path 14 may branch away from the first flow path 13 at a position downstream of the turbocharger 6, hence the air flowing through the electric supercharger 3 may already have been compressed by the compressor wheel 11 of the turbocharger 6. However, such a contrary arrangement does not alter the disclosed modes of operation of the valve mechanism 50 because the electric supercharger 3 is only operated at times wherein the electric supercharger 3 can provide air at a greater pressure than the turbocharger 6 alone, hence the activation of the electric supercharger 3 always results in the air entering the supercharger inlet port 42 through the second flow path 14 having a greater pressure than the air entering the turbocharger inlet port 32 through the first flow path 13. The operation of the disclosed valve mechanism 50 is accordingly unchanged by the alternative configuration of the branching of the flow paths 13, 14.

During operation of the turbocharger system 1 in the turbocharger mode of operation the valve mechanism 50 is placed in the first position wherein the flap 52 rests against the planar surface 36 and the support structure 57 while blocking flow through the opening 34 into the supercharger inlet port 42. Air originating from the compressor wheel 11 of the turbocharger 6 flows through the first flow path 13 and enters the turbocharger inlet port 32 of the charge cooler 4. The air then flows through the flow openings 66 provided in the guide frame 60 and past the opening 34. The air applies a pressure to the flap 52 that maintains the flap 52 against the planar surface 36 and the support structure 56 against the pressure of air within the supercharger inlet port 42. The flow of the air through the turbocharger inlet port 32 is shown in FIG. 8 as a dashed line having an arrow indicating the flow direction of the air. The air flowing through the turbocharger inlet port 32 then reaches the manifold portion 38 of the inlet tank 22 wherein the air is distributed to the plurality of the heat exchanger tubes 26. The air is recombined in the outlet tank 24 before the air is delivered to the engine 5.

During operation of the turbocharger system 1 in the supercharger mode of operation the pressure of the air originating from the electric supercharger 3 increases until the air entering the supercharger inlet port 42 from the second flow path 14 is greater than the pressure of the air entering the turbocharger inlet port 32 from the first flow path 13. The pressure differential causes the valve mechanism 50 to move to the second position wherein the flap 52 flexes away from the opening 34 while conforming to the curved shape of the guide frame 60. The flap 52 covers each of the openings 66 formed in the guide frame 60 in order to prevent the flow entering the inlet end of the turbocharger inlet port 32 via the first flow path 13 from reaching the manifold portion 38 of the inlet tank 22. The air originating from the electric supercharger 3 and the second flow path 14 can accordingly flow from the supercharger inlet port 42 and into the turbocharger inlet port 32, as indicated by the dashed line having an arrow in FIG. 9, before entering the manifold portion 38 of the inlet tank 22.

During the supercharger mode of operation the turbocharger 6 continues to increase in compression capacity until the compressor wheel 11 is capable of compressing the air flowing the first flow path 13 to a desired extent and without the continued aid of the electric supercharger 3. The electric supercharger 3 is accordingly de-activated following such a determination while the pressure of the air originating from the first flow path 13 and entering the turbocharger inlet port 32 eventually exceeds the pressure of the air originating from the second flow path 14 and entering the supercharger inlet port 42. The valve mechanism 50 is accordingly repositioned back to the first position wherein the flap 52 again covers and blocks off the opening 34.

FIGS. 10 and 11 illustrate a valve mechanism 150 according to another embodiment of the invention. The valve mechanism 150 is substantially similar to the valve mechanism 50 except the flexible flap 52 is replaced with a rigid flap 152 hingedly coupled to the planar surface 36 of the sidewall 33 by a hinge mechanism 158. The flap 152 forms an adjustable valve element of the valve mechanism 150 configured for passive readjustment in response to a pressure differential across the valve mechanism 150. The flap 152 may be formed from any rigid material suitable for withstanding the temperature of the heated air passing through the inlet tank 22. The flap 152 may be formed from a rigid plastic or a metal, as non-limiting examples. The flap 152 may be formed to include the same perimeter shape as the flap 52, including a rectilinear first end 153 and a semi-circular second end 154.

The hinge mechanism 158 includes a hinge plate 160 having a first plurality of knuckles 162 extending therefrom, a second plurality of knuckles 155 formed at a first end 153 of the flap 152, and a hinge pin 159 configured for reception in a plurality of aligned openings formed in each of the knuckles 155, 162. The hinge plate 160 may be coupled to the sidewall 33 by one or more fasteners 151, as desired.

The valve mechanism 150 does not require a guide frame 60 due to the rigidity of the flap 152. The supercharger inlet port 42 does not require the inclusion of the support structure 56 for the same reason. However, the turbocharger inlet port 32 may include an edge 31 formed therein as a seating surface for a periphery of the flap 152 to engage when pivoted away from the opening 34.

The valve mechanism 150 operates substantially similarly to the valve mechanism 50, wherein the flap 152 is adjustable between a first position and a second position. The first position includes the flap 152 arranged in engagement with the planar surface 36 for blocking the opening 34 during the turbocharger mode of operation. The second position includes the flap 152 pivoted away from the opening 34 via the hinge mechanism 158 and against the edge 31 for unblocking the opening 34. The adjustment of the valve mechanism 150 between the first and second positions is dependent on the pressure of the air originating from each of the flow paths 13, 14.

Figure 13:
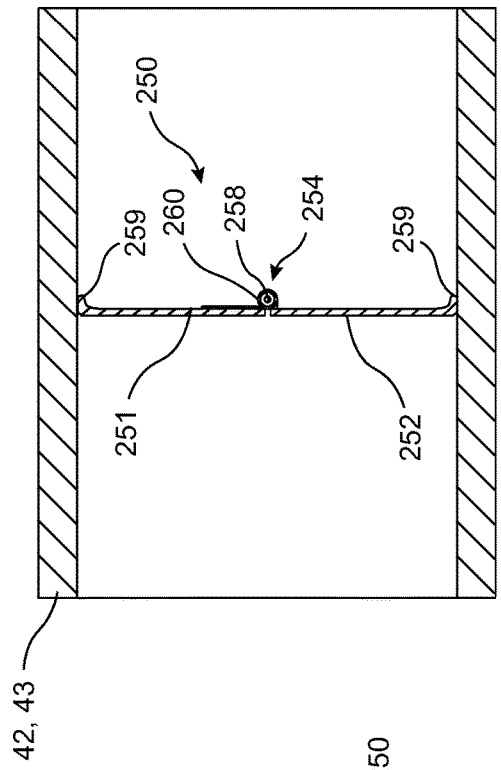
FIG. 13 is a cross-sectional elevational view of an inlet port having the valve mechanism of FIG. 12, wherein the valve mechanism is adjusted to a first position.
Figure 14:
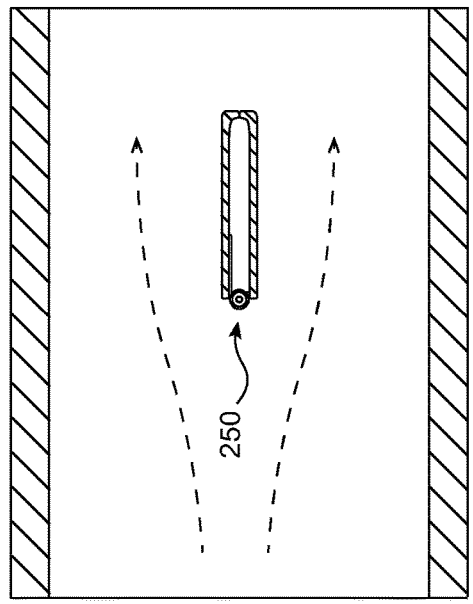
FIG. 14 is a cross-sectional elevational view of the inlet port having the valve mechanism of FIG. 12, wherein the valve mechanism is adjusted to a second position.
Figure 12:
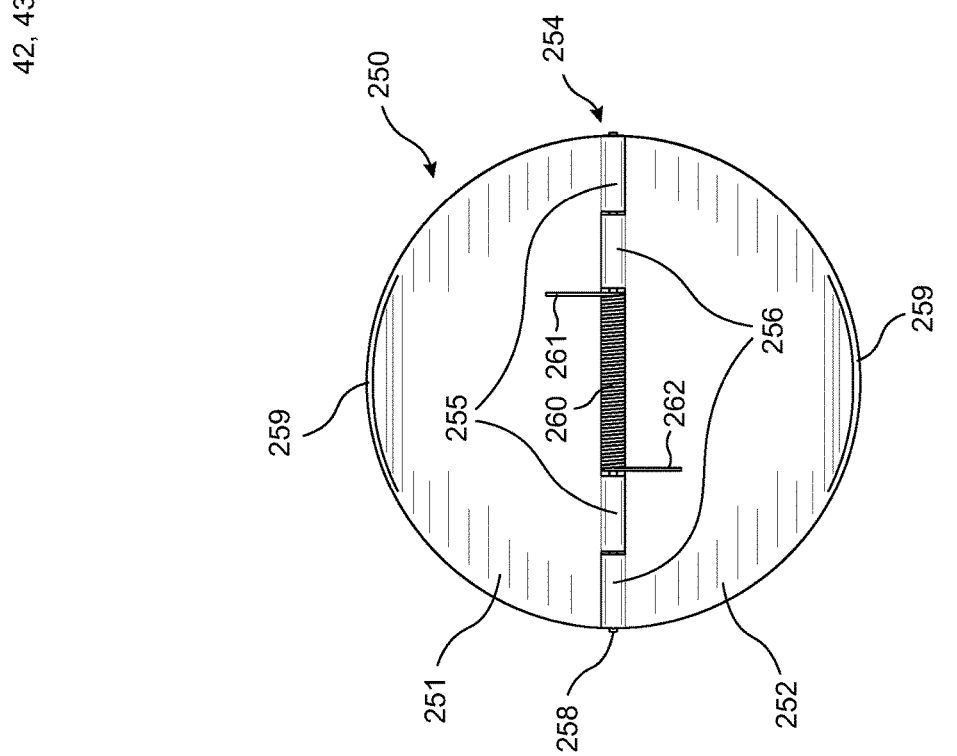
FIG. 12 is an elevational view of a valve mechanism according to another embodiment of the invention.

FIGS. 12-14 illustrate a valve mechanism 250 according to another embodiment of the invention. The valve mechanism 250 is configured for placement within the supercharger inlet port 42, wherein a flow of air originating from the electric supercharger 3 and the second flow path 14 flows from left to right when passing through the supercharger inlet port 42 from the perspective shown in FIGS. 13 and 14. The valve mechanism 250 includes a perimeter shape corresponding to a shape of an inner surface of the sidewall 43 of the supercharger inlet port 42. In the shown embodiment, the valve mechanism 250 includes a circular perimeter shape corresponding to the cylindrical shape of the supercharger inlet port 42, but other shapes may be selected for the supercharger inlet port 42 and the valve mechanism 250 without departing from the scope of the present invention.

The valve mechanism 250 includes a first wall 251 hingedly coupled to a second wall 252. A hinge mechanism 254 of the valve mechanism 250 includes a pair of first hinge knuckles 255 extending from the first wall 251, a pair of second hinge knuckles 256 extending from the second wall 252, and a hinge pin 258 extending through openings formed in the first and second hinge knuckles 255, 256. The hinge pin 258 forms an axis of rotation about which the first and second walls 251, 252 pivot. The hinge pin 258 extends between diametrically opposing side surfaces of the sidewall 43 defining the supercharger inlet port 42 and supports the valve mechanism 250 within the supercharger inlet port 42.

A torsion spring 260 surrounds the hinge pin 258 along a central region thereof. The torsion spring 260 may be formed from a coil of a resilient material wound around the hinge pin 258, but any type of torsion spring 260 may be used without departing from the scope of the present invention. The torsion spring 260 is shown as including a first extension 261 engaging the first wall 251 and a second extension 262 engaging the second wall 252. The extensions 261, 262 are configured to normally urge the first and second walls 251, 252 to a first position of the valve mechanism 250 wherein the first and second walls 251, 251 are arranged substantially co-planar to each other to extend across an entirety of a flow area of the supercharger inlet port 42, as shown in FIG. 13. The torsion spring 260 accordingly forms a biasing element for normally biasing the valve mechanism 250 to the first position. A second position of the valve mechanism 250 includes a collapsing of the first and second walls 251, 252 towards each other, as shown in FIG. 14, and must be performed against the urging of the torsion spring 260 towards the first position. The first and second walls 251, 252 accordingly form adjustable valve elements of the valve mechanism 250 configured for passive readjustment in response to a pressure differential across the valve mechanism 250.

A spacing projection 259 spaced from the axis of rotation of the valve mechanism 250 is formed at a distal end of each of the first and second walls 251, 252. The spacing projections 259 are configured to cooperate with each other to position the first and second walls 251, 252 in a substantially parallel orientation when the valve mechanism 250 is placed in the second position. The parallel orientation of the first and second walls 251, 252 prevents an excessive pressure drop experienced by the flow of the air passing over the valve mechanism 250 when in the second position.

During the turbocharger mode of operation, the valve mechanism 250 is normally in the first position as a result of each of the pressure of the air originating from the turbocharger 6 and the urging of the torsion spring 260. Upon activation of the electric supercharger 3 during the supercharger mode of operation, the pressure of the air originating from the electric supercharger 3 will eventually exceed the pressure of the air originating from the turbocharger 6. The valve mechanism 250 will begin to move towards the second position when a force caused by a pressure differential between the air originating from the electric supercharger 3 and the air originating from the turbocharger 6 exceeds the force of the torsion spring 260 urging the valve mechanism 250 towards the first position. The first and second walls 251, 252 pivot towards each other until the spacing projections 259 engage each other.

The placement of the valve mechanism 250 in the second position allows for the flow of the air originating from the electric supercharger 3 to pass by the valve mechanism 250 and to enter the turbocharger inlet port 32 and subsequently the manifold portion 38 of the inlet tank 22. Upon a discontinuing of the use of the electric supercharger 3, the valve mechanism 250 returns to the first position as a result of the spring force exerted by the torsion spring 260.

Figure 15:
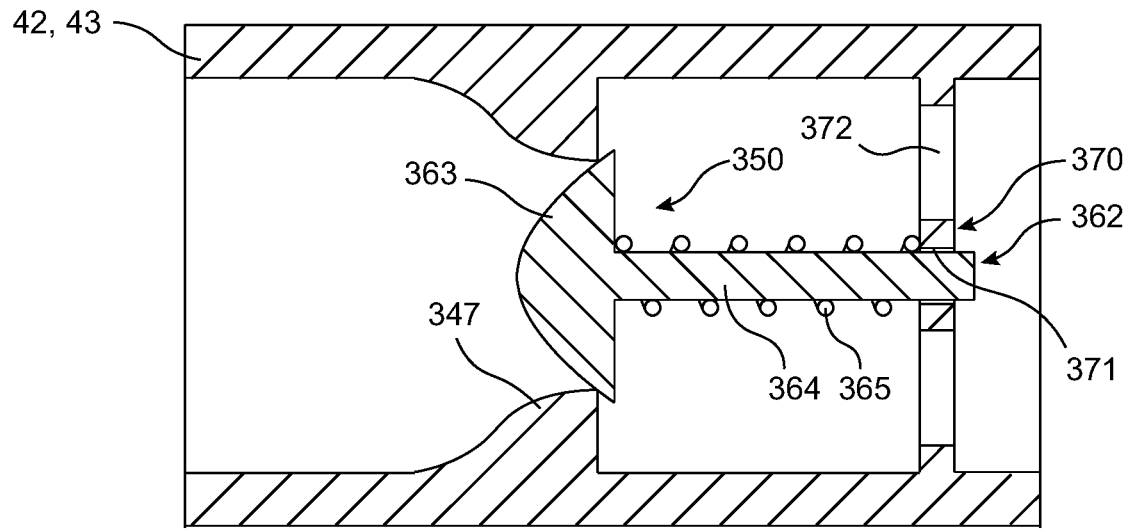
FIG. 15 is a cross-sectional elevational view of an inlet port having a valve mechanism according to another embodiment of the invention, wherein the valve mechanism is adjusted to a first position.
Figure 16:
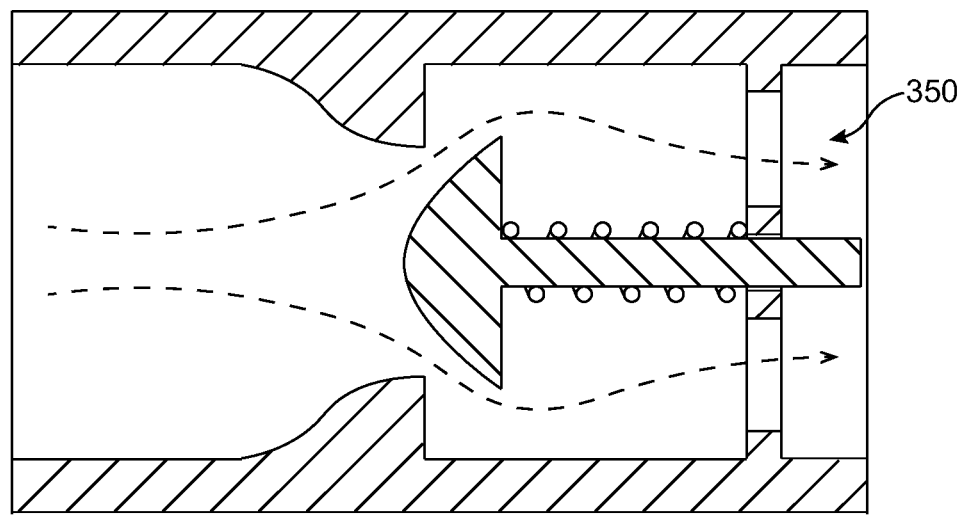
FIG. 16 is a cross-sectional elevational view of the inlet port having the valve mechanism of FIG. 15, wherein the valve mechanism is adjusted to a second position.

FIGS. 15 and 16 illustrate a valve mechanism 350 according to another embodiment of the invention. The valve mechanism 350 includes a piston 362, a spring element 365, and a support structure 370. The piston 362 includes a head 363 and a shaft 364. The shaft 364 is slidably received within an opening 371 formed in the support structure 370. The spring element 365 is a compression spring surrounding the shaft 364 of the piston 362 and disposed between the head 363 of the piston 362 and a portion of the support structure 370 surrounding the opening 371. The spring element 365 forms a biasing element configured to normally urge the head 363 of piston 362 in a direction away from the support structure 370. The piston 362 forms an adjustable valve element of the valve mechanism 350 configured for passive readjustment in response to a pressure differential across the valve mechanism 350.

The support structure 370 is coupled to or extends from an inner surface of the sidewall 43 of the supercharger inlet port 42. The support structure 370 defines at least one flow opening 372 for allowing air flowing through the valve mechanism 350 to pass through or around the support structure 370.

The valve mechanism 350 is disposed within a portion of the supercharger inlet port 42, wherein a flow of air originating from the electric supercharger 3 and the second flow path 14 flows from left to right when passing through the supercharger inlet port 42 from the perspective shown in FIGS. 15 and 16.

The supercharger inlet port 42 may include a modified structure when used in conjunction with the valve mechanism 350. The supercharger inlet port 42 includes an annular projection 347 extending radially inwardly from a remainder of the inner surface of the sidewall 43. The annular projection 347 forms a seating surface configured for engagement with the head 363 of the piston 362.

The piston 362 is configured to slide axially between a first position of the valve mechanism 350 (FIG. 15) wherein the head 363 of the piston 362 engages the annular projection 347 and blocks off flow past the valve mechanism 350 and a second position of the valve mechanism 350 (FIG. 16) wherein the head of the piston 363 is spaced from the annular projection 347 to allow flow originating from the electric supercharger 3 to pass by the valve mechanism 350 and to enter the turbocharger inlet port 32 and eventually the manifold portion 38 of the inlet tank 22.

When in the turbocharger mode of operation, the valve mechanism 350 is normally in the first position due to the force of the spring element 365 against head 363 of the piston 362 as well as the pressure of the air originating from the turbocharger 6 encountering the rear surface of the head 363.

Upon activation of the electric supercharger 3 during the supercharger mode of operation, the pressure of the air originating from the electric supercharger 3 increases until a force from the pressure of the air originating from the electric supercharger 3 exerted on the head 363 exceeds a combined force comprising the pressure of the air originating from the turbocharger 6 exerted on the head 363 and the force of the spring element 365 applied to the head 363. The piston 363 accordingly moves away from the seating surface formed by the annular projecting portion 347 and towards the second position, thereby allowing for air originating from the electric supercharger 3 to flow around the head 363 of the piston 362 and towards the turbocharger inlet port 32 and eventually the manifold portion 38 of the inlet tank 22.

Figure 18:
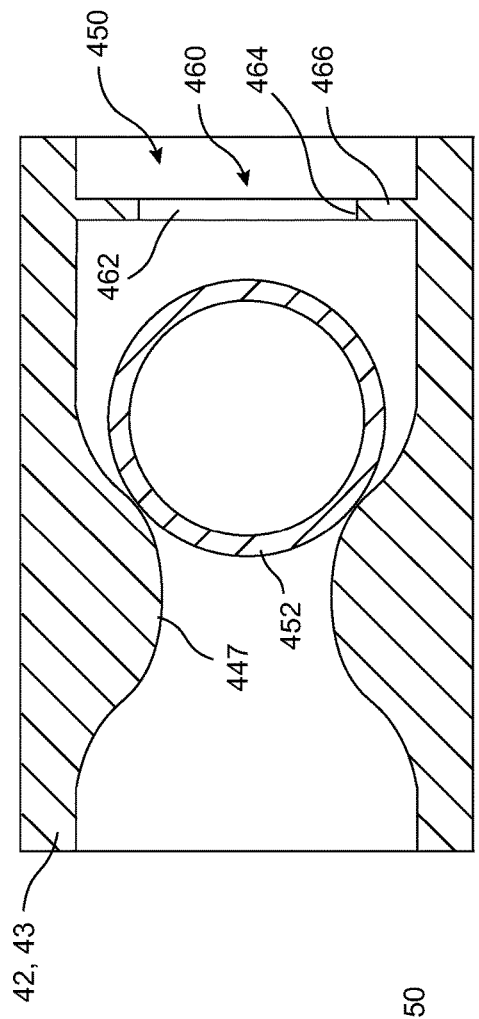
FIG. 18 is a cross-sectional elevational view of the inlet port of FIG. 17 when the valve mechanism is in a first portion.
Figure 19:
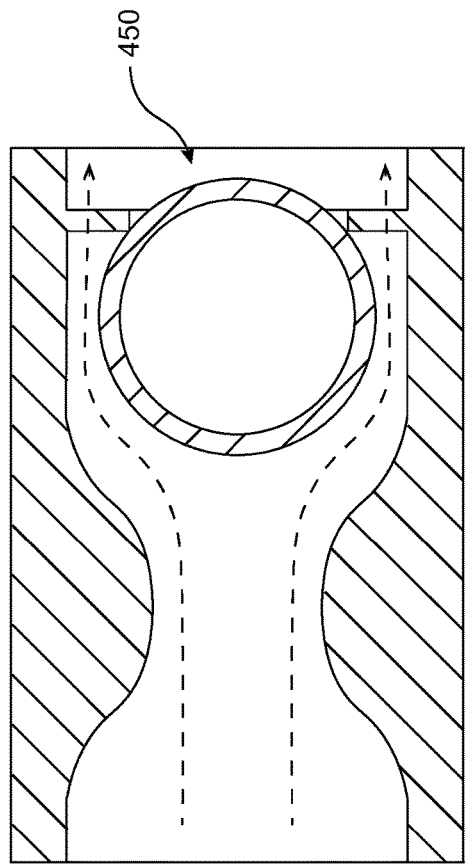
FIG. 19 is a cross-sectional elevational view of the inlet port of FIG. 17 when the valve mechanism is in a second position.
Figure 17:
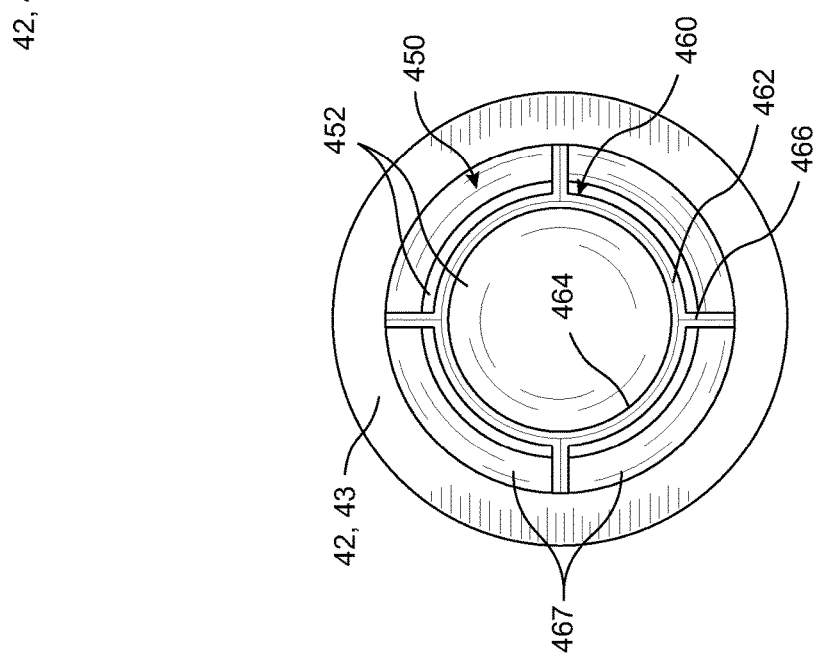
FIG. 17 is an elevational view of an inlet port having a valve mechanism disposed therein according to another embodiment of the present invention.

FIGS. 17-19 illustrate a valve mechanism 450 according to another embodiment of the invention. The valve mechanism 450 comprises a spherical ball 452 disposed within the supercharger inlet port 42, wherein a flow of air originating from the electric supercharger 3 and the second flow path 14 flows from left to right when passing through the supercharger inlet port 42 from the perspective shown in FIGS. 18 and 19. The supercharger inlet port 42 includes a radially inwardly extending annular projection 447 at an upstream side of the ball 452 with respect to the direction of flow of the air originating from the electric supercharger 3 and flowing through the supercharger inlet port 42. A seating structure 460 is disposed at a downstream side of the ball 452 with respect to the direction of flow of the air through the supercharger inlet port 42. The seating structure 460 includes an annular frame 462 having a circular opening 464 formed therein. The circular opening 464 has an inner diameter that is less than an outer diameter of the ball 452. A plurality of circumferentially spaced spokes 466 extend radially outwardly from the frame 462 to an inner surface of the sidewall 43 forming the supercharger inlet port 42. A plurality of flow openings 467 are interposed between adjacent ones of the spokes 466.

The valve mechanism 450 is adjustable between a first position (FIG. 18) and a second position (FIG. 19). The valve mechanism 450 is in the first position when the ball 452 is seated against a first annular seating surface formed by the annular projection 447. The valve mechanism 450 is in the second position when the ball 452 is seated against a second annular seating surface formed by a surface of the annular frame 462 defining the circular opening 464 therein. The ball 452 accordingly forms an adjustable valve element of the valve mechanism 450 configured for passive readjustment in response to a pressure differential across the valve mechanism 450.

During operation in the turbocharger mode of operation, the increased pressure of the air originating from the turbocharger 6 in comparison to the air originating from the electric supercharger 3 causes a side of the ball 452 facing towards the seating structure 460 to experience an increased pressure in comparison to the side of the ball 452 facing towards the annular projection 447. This pressure differential causes the ball 452 to move towards the annular projection 447 until the ball 452 is seated against the annular projection 447 in the first position, thereby stopping a flow of air originating from the turbocharger 6 from flowing past the annular projection 447 and towards the electric supercharger 3 while the valve mechanism 450 is placed in the first position.

Upon activation of the electric supercharger 3 in the supercharger mode of operation, the pressure of the air originating from the electric supercharger 3 increases until the pressure of the air originating from the electric supercharger 3 exceeds the pressure of the air originating from the turbocharger 6. The ball 452 moves towards the second position of the valve mechanism 450 wherein the ball 452 is seated against the annular frame 462 of the seating structure 460. The ball 452 is positioned in a central portion of the supercharger inlet port 42 to allow for the flow of air originating from the electric supercharger 3 to flow around the outer surface of the ball 452 and through the flow openings 467 surrounding the annular frame 462. The second position of the valve mechanism 450 accordingly allows for the air originating from the electric supercharger 3 to pass by the valve mechanism 450 to enter the turbocharger inlet port 32 and eventually the manifold portion 38 of the inlet tank 22.

FIGS. 20-22 illustrate a valve mechanism 550 according to another embodiment of the invention. The valve mechanism 550 is disposed within the supercharger inlet port 42, wherein a flow of air originating from the electric supercharger 3 and the second flow path 14 flows from left to right when passing through the supercharger inlet port 42 from the perspective shown in FIGS. 21 and 22. The valve mechanism 550 includes a support plate 552 and a reed plate 560. The support plate 552 includes a circular profile shape corresponding to the circular shape of the cylindrical supercharger inlet port 42. As shown in FIGS. 21 and 22, the support plate 552 is configured to extend across an entirety of a flow area through the supercharger inlet port 42 while angled with respect to a longitudinal direction of the supercharger inlet port 42. The support plate 552 is shown as angled at about 45 degrees relative to the longitudinal direction of the supercharger inlet port 42, but alternative angles may be used without departing from the scope of the present invention. The angled configuration of the support plate 552 results in the support plate 552 having a substantially elliptical perimeter shape. A flow opening 565 is formed through a central portion of the support plate 552.

The reed plate 560 is coupled to the support plate 552 between the flow opening 565 and an inner surface of the sidewall 43 of the supercharger inlet port 42. In the illustrated embodiment, the reed plate 560 is coupled to the support plate 552 by a pair of fasteners 551 having a nut and bolt configuration, but any coupling method may be used, as desired.

The reed plate 560 is dimensioned and positioned to normally cover an entirety of the flow opening 565 formed in the support plate 552 when the reed plate 560 is in a first position (FIG. 21), wherein the first position includes the reed plate 560 parallel to and engaging the support plate 552 about a periphery of the flow opening 565. The reed plate 560 is configured to flex away from the flow opening 565 when a force from the pressure of the air encountering the reed plate 560 through the flow opening 565 exceeds a force from the pressure of the air forcing the reed plate 560 towards the support plate 552. The reed plate 560 is placed in a second position (FIG. 22) when the reed plate 560 has pivoted away from the support plate 552 to allow fluid communication between opposing sides of the support plate 552 through the flow opening 565. The reed plate 560 accordingly forms an adjustable valve element of the valve mechanism 550 configured for passive readjustment in response to a pressure differential across the valve mechanism 550.

The reed plate 560 is formed from a resilient material configured to flex in response to a force and to return to an original shape when the force is no longer acting on the reed plate 560. The reed plate 560 may be formed from any resilient material having the requisite stiffness, durability, and resiliency, including a metallic material such as spring steel. The resiliency of the reed plate 560 allows for the reed plate 560 to return to the first position when a pressure differential is not present across the valve mechanism 550. The stiffness and resiliency of the reed plate 560 accordingly forms a biasing element for normally biasing the valve mechanism 550 towards the first position thereof.

During the turbocharger mode of operation the reed plate 560 is in the first position due to the force of the pressure of the air originating from the turbocharger 6. Upon activation of the electric supercharger 3 during the supercharger mode of operation, the pressure of the air originating from the electric supercharger 3 increases until a force from the pressure of the air originating from the electric supercharger 3 exerted on the reed plate 560 through the flow opening 565 exceeds a combined force comprising the pressure of the air originating from the turbocharger 6 exerted on the reed plate 560 and a spring force generated by the tendency of the resilient reed plate 560 to resist deformation away from the support plate 552. The reed plate 560 pivots away from the support plate 552 to open the flow opening 565, thereby allowing for air originating from the electric supercharger 3 to flow through the flow opening 565 and towards the turbocharger inlet port 32 and eventually the manifold portion 38 of the inlet tank 22.

Figure 23:
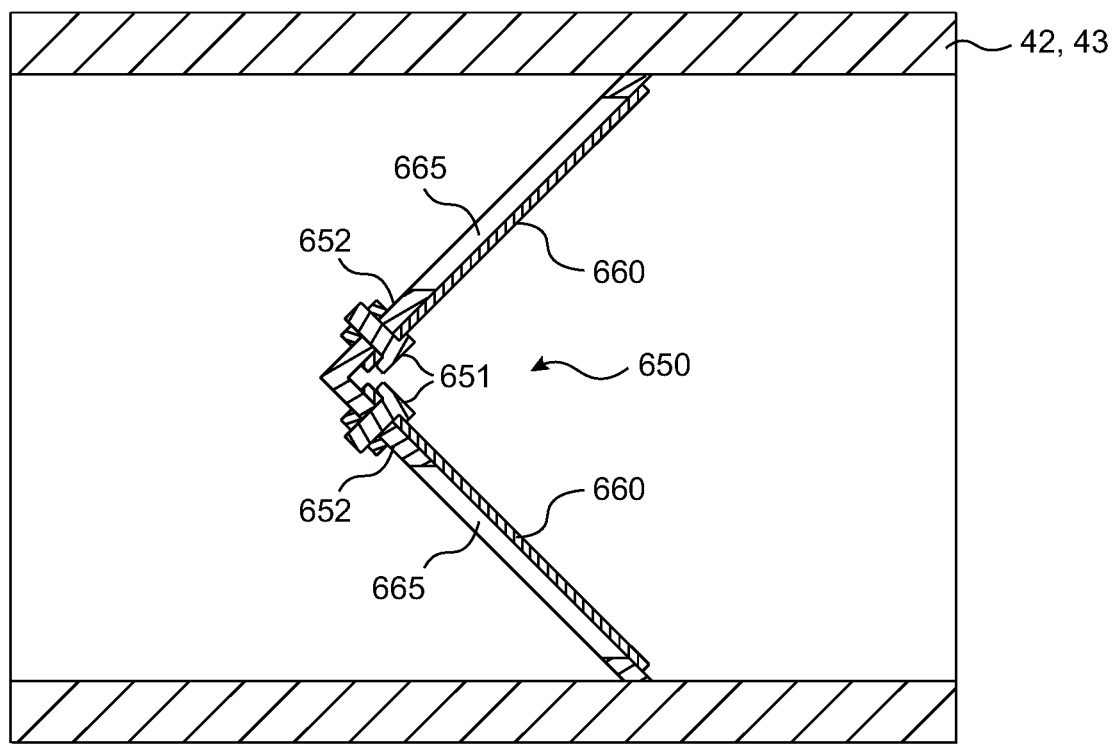
FIG. 23 is a cross-sectional elevational view of an inlet port having a valve mechanism according to another embodiment of the invention.

FIG. 23 illustrates a valve mechanism 650 according to another embodiment of the invention. The valve mechanism 650 is substantially similar to the valve mechanism 550, and includes a pair of support plates 652 arranged transversely to each other and meeting at a central portion of the supercharger inlet port 42 in which the valve mechanism 650 is disposed. The support plates 652 may be arranged symmetrically with respect to a plane passing through a center of the supercharger inlet port 42, as desired. In the shown embodiment, the support plates 652 are arranged at a 45 degree angle with respect to a direction of flow of the air originating from the supercharger 3 and passing through the supercharger inlet port 42, but other angles may be selected without departing from the scope of the present invention. The support plates 652 are arranged to extend across an entirety of a flow area through the supercharger inlet port 42. Due to the cylindrical shape of the supercharger inlet port 42, each of the support plates 652 may include a substantially semi-circular profile when viewed through the supercharger inlet port 42. Each of the support plates 652 may accordingly include a semi-elliptical perimeter shape to correspond to the cylindrical contour of the inner surface of the supercharger inlet port 42.

Each of the support plates 652 includes a corresponding reed plate 660. Each of the reed plates 660 is coupled to one of the support plates 652 adjacent the intersection of the support plates 652 by one or more fasteners 651. The reed plates 660 have the same characteristics as the reed plate 560 described with reference to the valve mechanism 550. Each of the reed plates 660 covers a corresponding flow opening 665 formed in one of the support plates 652. Each of the flow openings 665 and each of the reed plates 660 may have a substantially semi-elliptical perimeter shape resulting in a semi-circular profile shape when viewed through the supercharger inlet port 42.

The valve mechanism 650 operates in the same fashion as the valve mechanism 550, wherein a pressure of the air originating from the electric supercharger 3 overcomes the stiffness of each of the reed plates 660 to pivot each of the reed plates 660 away from a corresponding one of the flow openings 665. The symmetric arrangement of the flow openings 665 relative to a central plane of the supercharger inlet port 42 results in the air flowing past the valve mechanism 650 having a symmetric flow pattern, as opposed to the flow pattern of the air passing by the valve mechanism 550 due to the reed plate 560 thereof opening towards one side of the supercharger inlet port 42.

The valve mechanisms 50 and 150 are suited for preventing undesired air flow into either of the flow paths 13, 14 due to the manner in which each of the valve mechanisms 50, 150 pivots between a first position blocking flow from the electric supercharger 3 and a second position blocking flow from the turbocharger 6. It is beneficial to prevent the flow of air originating from the turbocharger 6 and the first flow path 13 from entering the second flow path 14 having the electric supercharger 3 because the air originating from the turbocharger 6 will have been heated by the compressor wheel 11 of the turbocharger 6, wherein such heated air is capable of damaging components of the electric supercharger 3 if encountered during a period of inactivity thereof. It is also beneficial to prevent the flow of air originating from the electric supercharger 3 and the second flow path 14 from flowing through a portion of the turbocharger inlet port 32 leading towards the first flow path 13. This is true because the additional flow volume of the portion of the turbocharger inlet port 32 and the first flow path 13 that are open and available for the air to enter when exiting the supercharger inlet port 42 tends to lower the pressure of the air eventually reaching the manifold portion 38, thereby lessening an efficiency of the turbocharger system 1.

The valve mechanisms 50, 150 thereby provide passive control of the flow of air entering the manifold portion 38 of the inlet tank 22, and subsequently the engine 5 of the motor vehicle. The passive control performed by the valve mechanisms 50, 150 greatly simplifies a control scheme of the turbocharger system 1 by eliminating the need for actively controlled electric components such as actively controlled valves between the charge cooler 4 and either of the electric supercharger 3 or the turbocharger 6.

The valve mechanisms 250, 350, 450, 550, 650 differ from the valve mechanisms 50, 150 in that the valve mechanisms 250, 350, 450, 550, 650 are each disposed exclusively within the supercharger inlet port 42 to prevent an undesired flow of air originating from the turbocharger 6 from reaching the second flow path 14 and the electric supercharger 3. As such, the valve mechanisms 250, 350, 450, 550, 650 do not prevent a flow of air originating from the electric supercharger 3 from flowing towards the first flow path 13 when entering the turbocharger inlet port 32. However, the inlet tank 22 may be modified to control flow into either of the inlet ports 32, 42 by merely repeating the structure of one of the valve mechanisms 250, 350, 450, 550, 650 within the turbocharger inlet port 32 upstream of the intersection of the inlet ports 32, 42. Any of the valve mechanisms 250, 350, 450, 550, 650 disposed within the turbocharger inlet port 32 would accordingly be arranged wherein a flow of air originating from the compressor wheel 11 would open each respective one of the valve mechanisms 250, 350, 450, 550, 650 during periods of exclusive use of the turbocharger 6 while each of the valve mechanisms 250, 350, 450, 550, 650 would close during periods of activity of the electric supercharger 3. The control of the flow of air reaching the manifold portion 38 of the inlet tank 22 could accordingly be controlled using any combination of the disclosed valve mechanisms 250, 350, 450, 550, 650 while also preventing undesired flow into either of the disclosed flow paths 13, 14 leading to the inlet tank 22.

Although the supercharger inlet port 42 is shown and described as intersecting the larger turbocharger inlet port 32, it should be understood that the inlet ports 32, 42 may be reversed in structure without significantly altering the operation of the turbocharger system 1. For example, the supercharger inlet port may have the larger diameter of the two inlet ports and may include a planar surface suitable for receiving the smaller diameter turbocharger inlet port. Each of the valve mechanisms 50, 150, 250, 350, 450, 550, 650 may accordingly be disposed to have the same relationship relative to the larger diameter supercharger inlet port as is disclosed herein relative to the turbocharger inlet port 32.

The valve mechanisms 50, 150, 250, 350, 450, 550, 650 are shown and described throughout as formed in a portion of an inlet tank 22 of the charge cooler 4. The inclusion of each of the valve mechanisms 50, 150, 250, 350, 450, 550, 650 within the inlet tank 22 beneficially reduces a complexity of the turbocharger system 1 by eliminating additional joints and flow lines upstream of the charge cooler 4. The elimination of such components allows for a packaging space of the turbocharger system 1 to be decreased, thereby providing additional space for other components.

Because each of the valve mechanisms 50, 150, 250, 350, 450, 550, 650 is disposed relative to structural elements of one or more of the inlet ports 32, 42, each of the valve mechanisms 50, 150, 250, 350, 450, 550, 650 may be said to cooperate with the structure of the inlet tank 22 for forming a valve assembly of the inlet tank 22. However, each of the passively controlled valve mechanisms 50, 150, 250, 350, 450, 550, 650 may be configured for use in forming a valve assembly relative to any structure disposed upstream of the charge cooler 4 without necessarily departing from the scope of the present invention. For example, the disclosed inlet ports 32, 42 may be adapted to form a fitting for joining two different fluid lines, wherein the fitting is disposed upstream of the inlet tank 22 of the charge cooler 4 and is formed independently from the inlet tank 22. Such a fitting may be suitable when the motor vehicle having the turbocharger system 1 does not include the proper packaging space for having the structure of the intersecting inlet ports 32, 42 formed immediately adjacent the inlet tank 22.

The structure of the intersecting inlet ports 32, 42 may further be adapted for passively controlling the flow of two fluid flows joining at an intersection of two fluid flow paths wherein there is an alternating of which of the two fluid flows has a greater pressure. Additionally, one skilled in the art should understand that the valve mechanisms 50, 150, 250, 350, 450, 550, 650 disclosed herein can be combined in a variety of different configurations to allow for a variety of different passive flow control configurations. The disclosed structure may also be adapted for the reception of additional inlet ports supplying a fluid at a variable pressure. For example, multiple different smaller diameter inlet ports may intersect the largest diameter inlet port with each of the smaller diameter inlet ports having one of the valve mechanisms 50, 150, 250, 350, 450, 550, 650 disposed relative thereto as disclosed herein, such as including one of the valve mechanisms 50, 150 at each intersection between the smaller diameter inlet ports and the larger diameter inlet port.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve assembly for an intake of an engine, the valve assembly comprising:
    a first conduit leading towards the intake of the engine, the first conduit having an inner surface defined by a sidewall, the sidewall including an opening formed therein;

a second conduit intersecting the first conduit, the opening formed in the sidewall of the first conduit providing fluid communication between the first conduit and the second conduit;

a flap formed from a flexible material, the flap including a first end coupled to the sidewall of the first conduit and a freely disposed second end, the flap passively adjustable to flex between a first position wherein the flap prevents fluid communication between the first conduit and the second conduit and a second position wherein the flap allows fluid communication between the first conduit and the second conduit; and a guide frame extending across a flow area of the first conduit adjacent the opening formed in the sidewall, wherein the guide frame curves about an axis arranged perpendicular to flow through each of the first conduit and the second conduit as the guide frame extends from a first end thereof adjacent the opening in the sidewall to a second end thereof, wherein the flap flexes to engage the guide frame when adjusted to the second position.

2. The valve assembly of claim 1, wherein the flap is adjusted between the first position and the second position based on a pressure differential present between a pressure of a fluid in the first conduit and a pressure of a fluid in the second conduit.

3. The valve assembly of claim 2, wherein the flap is in the first position when the pressure of the fluid in the first conduit is greater than the pressure of the fluid in the second conduit, and wherein the flap is in the second position when the pressure of the fluid in the second conduit is greater than the pressure of the fluid in the first conduit.

4. The valve assembly of claim 1, wherein a curvature of the guide frame forms a convex surface in the guide frame facing directly towards the opening formed in the sidewall, wherein the flap conforms to a curved shape of the convex surface when adjusted to the second position.

5. The valve assembly of claim 1, wherein the guide frame includes at least one flow opening formed therethrough providing fluid communication between a first end of the first conduit and a second end of the first conduit.

6. The valve assembly of claim 5, wherein the first end of the first conduit communicates with the second end of the first conduit through the at least one flow opening when the flap is adjusted to the first position, and wherein the first end of the first conduit is prevented from communicating with the second end of the first conduit through the at least one flow opening when the flap is adjusted to the second position.

7. The valve assembly of claim 6, wherein the guide frame curves about an axis perpendicular to the flow through the at least one flow opening of the guide frame.

8. The valve assembly of claim 1, wherein the flexible material comprises an elastomer.

9. The valve assembly of claim 8, wherein the flexible material further comprises a filler material.

10. The valve assembly of claim 1, wherein an inner surface of the sidewall of the first conduit defines a substantially planar surface and a concave surface.

11. The valve assembly of claim 10, wherein the opening is formed in the planar surface of the sidewall and the flap is coupled to the planar surface of the sidewall.

12. The valve assembly of claim 10, wherein the flap engages a portion of the planar surface of the sidewall surrounding the opening when the flap is in the first position.

13. The valve assembly of claim 1, wherein a support structure extends across the opening formed in the sidewall.

14. The valve assembly of claim 1, wherein the flap and an inner surface of the sidewall of the first conduit are each substantially D-shaped.

15. An inlet tank for a charge cooler comprising:

a manifold portion;

a turbocharger inlet port in fluid communication with a compressor wheel of a turbocharger and the manifold portion, an opening formed in a sidewall of the turbocharger inlet port;

a supercharger inlet port in fluid communication with a compression mechanism of an electric supercharger, the opening formed in the sidewall of the turbocharger inlet port providing fluid communication between the supercharger inlet port and the turbocharger inlet port; and a valve mechanism including a flexible flap and a guide frame, the flap including a first end coupled to the sidewall of the turbocharger inlet port and a freely disposed second end, the guide frame extending across a flow area of the turbocharger inlet port adjacent the opening formed in the sidewall, wherein the guide frame curves about an axis arranged perpendicular to flow through each of the turbocharger inlet port and the supercharger inlet port as the guide frame extends from a first end thereof adjacent the opening in the sidewall to a second end thereof, the flap passively adjustable to flex between a first position wherein the flap prevents fluid communication between the turbocharger inlet port and the supercharger inlet port and a second position wherein the flap allows fluid communication between the turbocharger inlet port and the supercharger inlet port, wherein the flap flexes to engage the guide frame when adjusted to the second position.

16. The inlet tank of claim 15, wherein the flap flexes to engage the sidewall around the opening formed therein when adjusted to the first position thereof.

17. The inlet tank of claim 15, wherein the valve mechanism is adjusted to the first position when a pressure of air disposed within the turbocharger inlet port is greater than a pressure of air disposed within the supercharger inlet port and wherein the valve mechanism is adjusted to the second position when the pressure of the air disposed within the supercharger inlet port is greater than the pressure of the air disposed within the turbocharger inlet port.

* * * * *